Feb. 23, 1926.
V. H. HURT
TIRE CORE
Filed July 2, 1921
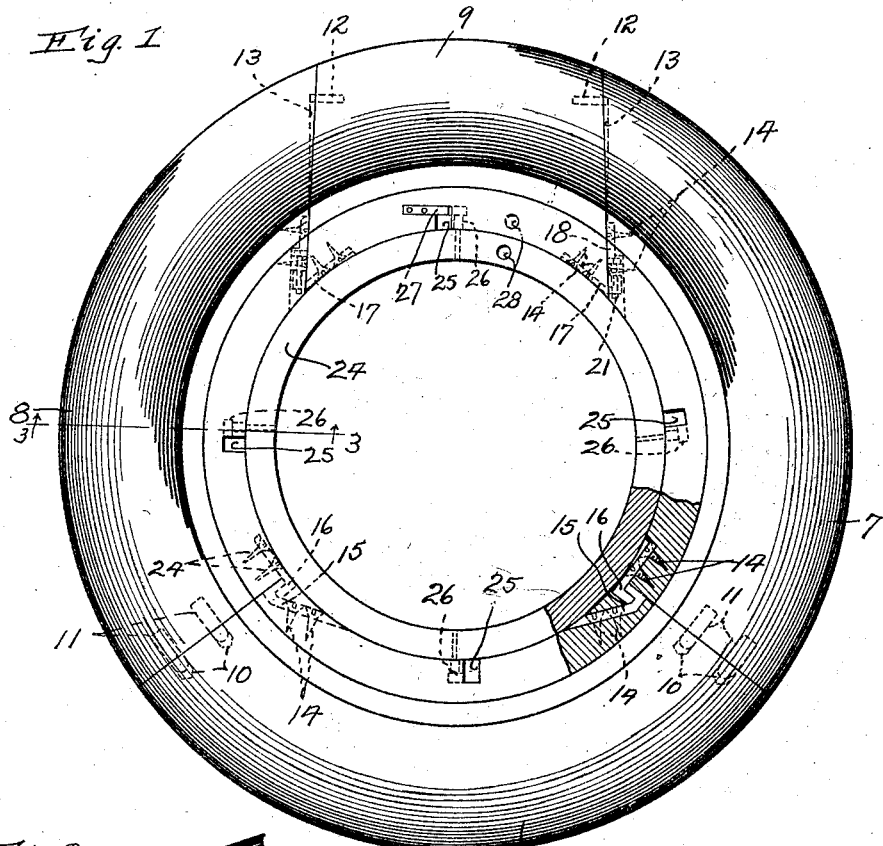
Fig. 1
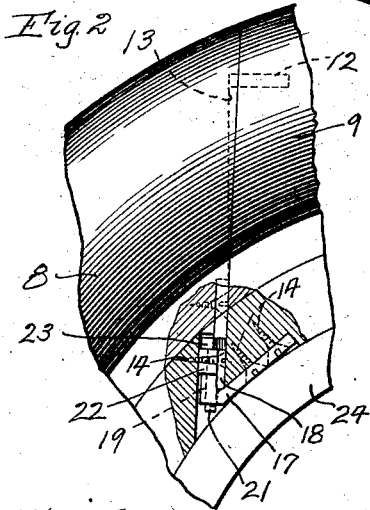
Fig. 2
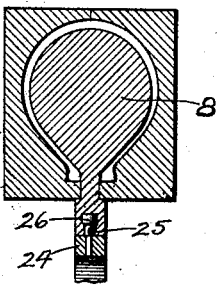
Fig. 3
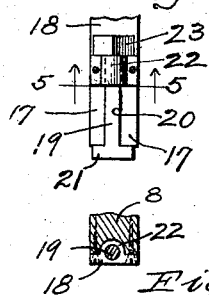
Fig. 4
Fig. 5
Inventor:
Victor H. Hurt,
By Nissen & Crane
Attys.

Patented Feb. 23, 1926.

1,574,093

UNITED STATES PATENT OFFICE.

VICTOR H. HURT, OF FORT MADISON, IOWA.

TIRE CORE.

Application filed July 2, 1921. Serial No. 482,113.

*To all whom it may concern:*

Be it known that I, VICTOR H. HURT, a citizen of the United States, residing at Fort Madison, in the county of Lee and State of Iowa, have invented certain new and useful Improvements in Tire Cores, of which the following is a specification.

My invention relates to tire cores for vehicle tires, and the like, and has for one of its objects the provision of simple and efficient means for securing the sections of a sectional tire core in operative position.

A further object is the provision of holding means for the sections of a vehicle tire core, which permits quick and easy adjustment of the sections into operative condition, and as quickly and easily demounting them.

A further object is the provision of a tire core holding means, such as mentioned, which can be operated without the adjustment of any nuts or bolts.

Other objects will appear hereinafter.

An embodiment of my invention is indicated in the accompanying drawing, forming a part of this specification, and in which—

Fig. 1 is a side view of a tire core embodying my invention and having portions broken away to expose underlying parts;

Fig. 2 is an enlarged fragmental view, partly in section, showing a connection between two of the core sections;

Fig. 3 is a section taken on line 3—3 of Fig. 1;

Fig. 4 is an enlarged fragmental view showing a locking connection used in the construction; and Fig. 5 is a section taken on line 5—5 of Fig. 4.

Referring more particularly to the drawing, I have indicated an annular tire core made up of four sections 6, 7, 8 and 9. Tire cores upon which straight side tires are formed now in the usual practice are divided similarly or formed in sections substantially the same as that indicated in Fig. 1. My improvement consists in the novel fastening means for securing the sections together.

With my improved construction section 6 of the core is provided with openings 10 which receive dowels 11 in the adjacent ends of sections 7 and 8 so as to maintain the sections 6, 7 and 8 against relative lateral displacements.

Section 9 of the core is somewhat wedge-shaped and is provided with a dowel pin 12 in each end adapted to engage dowel openings 13 in the adjacent ends of sections 7 and 8. Inasmuch as section 9 is of wedge form and in practice is slid radially out into position the openings 13 are in the form of slots so as to permit the passage of pins 12 to the positions indicated in Fig. 1.

On each end of each section 6, 7, 8 and 9 I provide a hook member which may be secured in any desirable manner, such as by the screws 14. On section 6 the hook members 15 have their points or toes pointing toward the center of the core and the hooks 16 on the adjacent ends of sections 7 and 8 have their points or toes extending outwardly from the center of the core and in positions to engage hooks 15 substantially as indicated in Fig. 1. In assembling, the tire core section 6 is first placed in the tire or in other operative position and the sections 7 and 8 placed so that their hooks 16 engage the hooks 15 of section 6. Then swinging on said hooks the sections 7 and 8 are moved out to the positions indicated in Fig. 1 where the dowel pins 11 will engage the openings 10.

At each end of section 9 I have provided a hook 17 secured as by screws 14 and having the points of said hooks extending outwardly in the general directions of the planes at the ends of said section 9. On the adjacent ends of sections 7 and 8 I have provided hooks or projections 18 which extend inwardly in the general directions of the planes at said ends of the sections 7 and 8 and in position to engage the hooks 17, as clearly indicated in Fig. 2. The members 18 may be secured by screws 14 or in any other desirable manner.

After sections 7 and 8 have been brought to their positions indicated in Fig. 1, section 9 is placed in the center of the core and pressed outwardly and upwardly, as shown in said figure, to its position. In this movement the hooks 17 are brought up on to hooks or projections 18, as clearly indicated in Figs. 1 and 2, and to prevent downward movement of the section 9 I provide locking bolts 19 which are adapted to engage slots 20 in hooks 17 and provided with T-heads 21 also adapted to engage said hooks 17, as clearly indicated in Figs. 2 and 4. The bolts 19 are pivotally mounted in bearings 22 on hook member 18 and provided with an enlargement or stop 23 on their upper ends. In placing section 9 in its position indicated, the head 21 is turned so that it can pass through slot 20, and when section 9 is brought to its position indicated, head 21 may be turned with any suitable instrument, not shown, to its position indicated in Fig. 4 with its head engaging the under side of hook 17. This effectively locks the hooks 17 and 18 from disengagement.

The arrangement already described will hold the sections of the core in annular form in operative position under ordinary circumstances, but sometimes it may be desirable to provide further securing means for the annular core. In such instances I provide a ring 24 which has its outer periphery adapted to engage the inner periphery of the core sections when the latter are in their positions indicated. As a means for holding the ring 24 in position I have indicated irregularly shaped slots 25 in the core sections and studs, pins, bolts, or other means 26 on the outer periphery of the ring engaging said slots. The number of slots 25 and members 26 may be varied as desired. In assembling, the sections are placed in the positions indicated, with ring 24 in the annular opening of the assembled sections and the members 26 then moved into the openings 25. Upon limited rotation of the ring with respect to the core sections the members 26 will be brought to their positions indicated in dotted lines in Fig. 1. To prevent retrograde movement of the members 26 I have indicated a stop member 27 adjacent one of the openings 25 arranged to engage the member 26 in such opening and prevent rotation of the ring 24.

I prefer to make the core sections without projections. Also, the ring 24 is formed without projections, except for the members 26, and when the latter are in the openings 25 the whole arrangement will have no projections on its outer surfaces. In order to facilitate rotating the ring 24 to bring the members 26 to their positions indicated in Fig. 1 I have provided two recesses 28, as indicated in Fig. 1, for engagement with a suitable wrench, not shown, to effect relative movement of the ring and sections. As many of the recesses 28 may be provided as desired, or any other means for effecting rotation of the ring with respect to the tire sections may be provided.

In some cases the hooks between the sections of the core may be entirely dispensed with and only the ring 24 used to lock the sections in place. It will be apparent also that the locking means between the sections and the ring 24 may be dispensed with in some cases.

Obviously those skilled in the art may make various changes in the details and arrangements of parts without departing from the spirit and scope of my invention as defined by the claims hereto appended, and I wish therefore not to be restricted to the precise construction herein disclosed.

I claim:—

1. A tire core comprising a plurality of arc-shaped members in abutting relations, interlock hooks rigidly attached to adjacent ends of said sections locking the latter in annular form, and means disposed in adjacent ends of said arc-shaped members for restraining lateral movement of such members relative to each other at the outer periphery of said tire core.

2. A tire core comprising a plurality of arc-shaped members in abutting relations, one of said members forming a wedge; hooks rigidly attached to adjacent ends of certain of said members holding the latter in annular form; and means disposed in recesses in adjacent ends of said arc-shaped sections near the periphery of said tire core to prevent lateral movement of the outer portions of said tire core relative to each other.

3. A tire core comprising a plurality of arc-shaped sections in abutting relations; hooks rigidly attached at the inner peripheries of said sections locking the latter in annular form; and a ring engaging the inner peripheries of said arc-shaped sections facilitating the holding of the latter in operative positions, stopping means to prevent rotation of said ring.

4. A tire core comprising a plurality of arc-shaped members each having an irregular slot in its inner periphery; means on said sections holding the latter against movement away from each other; and a ring engaging the inner periphery of said sections; means on the ring engaging said irregular slots holding the latter in operative positions.

5. A tire core comprising a plurality of arc-shaped sections in abutting relations; hooks connecting the sections together, certain of said hooks having slots therein; and T-headed bolts pivotally mounted for rotation on their axes and engaging said slots locking said hooks against unfastening.

6. A tire core comprising a plurality of arc-shaped members each having an irregular slot in its inner periphery; hooks rigidly attached to and fastening said members together; a ring engaging the inner peripheries of said members; and bolts on said ring engaging said irregular slots.

7. A tire core comprising a plurality of arc-shaped members disposed in annular form and having slots in their inner periphery; dowel pins and recesses in adjacent ends of said arc-shaped members; a ring disposed inside of said members; radial pins on the ring extending into said slots; and a stop one of said arc-shaped members adjacent the slot in the latter holding said pin in said slot.

8. A tire core comprising a plurality of arc-shaped sections in abutting relations, one of said sections being wedge-shaped; hooks on said wedge-shaped section having slots therein; hooks on the sections adjacent said wedge-shaped section engaging the first-mentioned hooks; and T-head bolts journaled in said second-mentioned hooks disposed in said slots and having heads engaging the first-mentioned hooks locking the wedge-shaped section in operative position.

9. A tire core comprising a plurality of arc-shaped members each having an irregular slot in its inner periphery; locking means between said members; a ring engaging the inner peripheries of said members radially disposed bolts on the outer periphery of said ring engaging said irregular slots; and means associated with one of said slots for holding said bolts in said slots.

10. A tire core comprising four arc-shaped members, one of said members being wedge-shaped; hooks rigidly attached to said members; T-head bolts pivotally mounted in the hooks attached to the members adjacent the wedge-shaped member locking said hooks against unfastening; a ring engaging the inner peripheries of said members; and means locking said ring to said members.

In testimony whereof I have signed my name to this specification on this 27th day of June, A. D. 1921.

VICTOR H. HURT.